United States Patent
Zhao et al.

(10) Patent No.: US 11,097,511 B2
(45) Date of Patent: Aug. 24, 2021

(54) METHODS OF FORMING POLYMER COATINGS ON METALLIC SUBSTRATES

(71) Applicants: Lei Zhao, Houston, TX (US); Zhiyue Xu, Cypress, TX (US)

(72) Inventors: Lei Zhao, Houston, TX (US); Zhiyue Xu, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 960 days.

(21) Appl. No.: 14/546,332

(22) Filed: Nov. 18, 2014

(65) Prior Publication Data
US 2016/0136928 A1    May 19, 2016

(51) Int. Cl.

| | | |
|---|---|---|
| *B32B 9/04* | (2006.01) | |
| *B32B 9/00* | (2006.01) | |
| *B32B 15/08* | (2006.01) | |
| *B32B 37/02* | (2006.01) | |
| *B32B 15/01* | (2006.01) | |
| *B32B 15/14* | (2006.01) | |
| *B32B 7/12* | (2006.01) | |
| *B32B 15/20* | (2006.01) | |
| *B32B 7/04* | (2019.01) | |
| *B32B 37/06* | (2006.01) | |
| *B32B 37/10* | (2006.01) | |

(52) U.S. Cl.
CPC .............. *B32B 9/041* (2013.01); *B32B 7/04* (2013.01); *B32B 7/12* (2013.01); *B32B 9/005* (2013.01); *B32B 9/007* (2013.01); *B32B 9/04* (2013.01); *B32B 15/01* (2013.01); *B32B 15/08* (2013.01); *B32B 15/14* (2013.01); *B32B 15/20* (2013.01); *B32B 37/02* (2013.01); *B05D 2202/00* (2013.01); *B05D 2203/30* (2013.01); *B05D 2350/60* (2013.01); *B05D 2601/20* (2013.01); *B32B 37/06* (2013.01); *B32B 37/10* (2013.01); *B32B 2250/02* (2013.01); *B32B 2255/26* (2013.01); *B32B 2262/101* (2013.01); *B32B 2262/105* (2013.01); *B32B 2262/106* (2013.01); *B32B 2264/10* (2013.01); *B32B 2264/102* (2013.01); *B32B 2264/105* (2013.01); *B32B 2264/107* (2013.01); *B32B 2264/108* (2013.01); *B32B 2307/538* (2013.01); *B32B 2309/02* (2013.01); *B32B 2309/12* (2013.01); *B32B 2457/00* (2013.01); *B32B 2581/00* (2013.01); *B32B 2605/08* (2013.01); *B32B 2605/12* (2013.01); *B32B 2605/18* (2013.01)

(58) Field of Classification Search
None
See application file for complete search history.

(56) References Cited

U.S. PATENT DOCUMENTS

| | | | |
|---|---|---|---|
| 3,361,561 A | * | 1/1968 | Pinter .................. B23K 35/262 420/557 |
| 3,807,996 A | | 4/1974 | Sarah |
| 3,904,405 A | | 9/1975 | Russell et al. |
| 3,956,568 A | | 5/1976 | Kanemaru et al. |
| 3,967,935 A | | 7/1976 | Frehn |
| 3,981,427 A | | 9/1976 | Brookes |
| 4,116,451 A | | 9/1978 | Nixon et al. |
| 4,205,858 A | | 6/1980 | Shimazaki et al. |
| 4,234,638 A | | 11/1980 | Yamazoe et al. |
| 4,270,569 A | | 6/1981 | Reay et al. |
| 4,372,393 A | | 2/1983 | Baker |
| 4,383,970 A | | 5/1983 | Komuro et al. |
| 4,426,086 A | | 1/1984 | Fournie et al. |
| 4,567,103 A | | 1/1986 | Sara |
| 4,743,033 A | | 5/1988 | Guess |
| 4,780,226 A | | 10/1988 | Sheets et al. |
| 4,798,771 A | | 1/1989 | Vogel |
| 4,799,956 A | | 1/1989 | Vogel |
| 4,826,181 A | | 5/1989 | Howard |
| 4,885,218 A | | 12/1989 | Andou et al. |
| 5,117,913 A | | 6/1992 | Thernig |
| 5,134,030 A | | 7/1992 | Ueda et al. |
| 5,195,583 A | | 3/1993 | Toon et al. |
| 5,201,532 A | | 4/1993 | Salesky et al. |

(Continued)

FOREIGN PATENT DOCUMENTS

| | | |
|---|---|---|
| CA | 2429780 A1 | 12/2003 |
| EP | 0539011 A1 | 4/1993 |

(Continued)

OTHER PUBLICATIONS

International Search Report and Written Opinion; International Application No. PCT/US2015/056196; International Filing Date: Oct. 19, 2015; dated Jan. 26, 2016; 13 pages.
Baxter et al., "Microstructure and solid particle erosion of carbon-based materials used for the protection of highly porous carbon-carbon composite thermal insulation", Journal of Materials Science, vol. 32, 1997, pp. 4485-4492.
Etter et al., "Aluminium carbide formation in interpenetrating graphite/aluminium composites", Materials Science and Engineering, Mar. 15, 2007, vol. 448, No. 1, pp. 1-6.

(Continued)

*Primary Examiner* — Callie E Shosho
(74) *Attorney, Agent, or Firm* — Cantor Colburn LLP

(57) ABSTRACT

An article comprises a substrate; a polymer coating; and an intermediate layer disposed between the substrate and the polymer coating, the intermediate layer comprising a carbon composite, wherein the carbon composite comprises carbon and a binder containing one or more of the following: $SiO_2$; Si; B; $B_2O_3$; a metal; or an alloy of the metal; and wherein the metal comprises one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

21 Claims, 2 Drawing Sheets

(56) References Cited

U.S. PATENT DOCUMENTS

| | | |
|---|---|---|
| 5,225,379 A | 7/1993 | Howard |
| 5,228,701 A | 7/1993 | Greinke et al. |
| 5,247,005 A | 9/1993 | Von Bonin et al. |
| 5,257,603 A | 11/1993 | Bauer et al. |
| 5,283,121 A | 2/1994 | Bordner |
| 5,286,574 A | 2/1994 | Foster et al. |
| 5,362,074 A | 11/1994 | Gallo et al. |
| 5,392,982 A | 2/1995 | Li |
| 5,455,000 A | 10/1995 | Seyferth et al. |
| 5,467,814 A | 11/1995 | Hyman et al. |
| 5,494,753 A | 2/1996 | Anthony |
| 5,495,979 A | 3/1996 | Sastri et al. |
| 5,499,827 A | 3/1996 | Suggs et al. |
| 5,509,555 A | 4/1996 | Chiang et al. |
| 5,522,603 A | 6/1996 | Naitou et al. |
| 5,545,474 A | 8/1996 | Podlaseck et al. |
| 5,730,444 A | 3/1998 | Notter |
| 5,765,838 A | 6/1998 | Ueda et al. |
| 5,791,657 A | 8/1998 | Cain et al. |
| 5,968,653 A | 10/1999 | Coppella et al. |
| 5,992,857 A | 11/1999 | Ueda et al. |
| 6,020,276 A | 2/2000 | Hoyes et al. |
| 6,027,809 A | 2/2000 | Ueda et al. |
| 6,065,536 A | 5/2000 | Gudmestad et al. |
| 6,075,701 A | 6/2000 | Ali et al. |
| 6,105,596 A | 8/2000 | Hoyes et al. |
| 6,128,874 A | 10/2000 | Olson et al. |
| 6,131,651 A | 10/2000 | Richy, III |
| 6,152,453 A | 11/2000 | Kashima et al. |
| 6,161,838 A | 12/2000 | Balsells |
| 6,182,974 B1 | 2/2001 | Harrelson |
| 6,183,667 B1 | 2/2001 | Kubo et al. |
| 6,234,490 B1 | 5/2001 | Champlin |
| 6,258,457 B1 | 7/2001 | Ottinger et al. |
| 6,273,431 B1 | 8/2001 | Webb |
| 6,383,656 B1 | 5/2002 | Kimura et al. |
| 6,506,482 B1 | 1/2003 | Burton et al. |
| 6,585,053 B2 | 7/2003 | Coon et al. |
| 6,789,634 B1 | 9/2004 | Denton |
| 6,880,639 B2 | 4/2005 | Rhodes et al. |
| 6,933,531 B1 | 8/2005 | Ishikawa et al. |
| 7,105,115 B2 | 9/2006 | Shin |
| 7,138,190 B2 | 11/2006 | Bauer et al. |
| 7,470,468 B2 | 12/2008 | Mercuri et al. |
| 7,666,469 B2 | 2/2010 | Weintritt et al. |
| 7,758,783 B2 | 7/2010 | Shi et al. |
| 9,325,012 B1 | 4/2016 | Xu et al. |
| 2001/0003389 A1 | 6/2001 | Pippert |
| 2001/0039966 A1 | 11/2001 | Walpole et al. |
| 2002/0114952 A1 | 8/2002 | Ottinger et al. |
| 2003/0137112 A1 | 7/2003 | Richter et al. |
| 2004/0097360 A1 | 5/2004 | Benitsch et al. |
| 2004/0121152 A1 | 6/2004 | Toas |
| 2004/0127621 A1 | 7/2004 | Drzal et al. |
| 2004/0155382 A1 | 8/2004 | Huang et al. |
| 2004/0186201 A1 | 9/2004 | Stoffer et al. |
| 2004/0247931 A1* | 12/2004 | Weihs .................. B23K 1/0006 428/635 |
| 2005/0166987 A1* | 8/2005 | Matsubara ............ B21C 37/154 138/142 |
| 2006/0042801 A1 | 3/2006 | Hackworth et al. |
| 2006/0220320 A1 | 10/2006 | Potier et al. |
| 2006/0241237 A1 | 10/2006 | Drzal et al. |
| 2006/0249917 A1 | 11/2006 | Kosty |
| 2006/0272321 A1 | 12/2006 | Mockenhaupt et al. |
| 2007/0009725 A1 | 1/2007 | Noguchi et al. |
| 2007/0054121 A1 | 3/2007 | Weintritt et al. |
| 2007/0142547 A1 | 6/2007 | Vaidya et al. |
| 2007/0158619 A1 | 7/2007 | Wang et al. |
| 2007/0243407 A1 | 10/2007 | Delannay et al. |
| 2007/0257405 A1 | 11/2007 | Freyer |
| 2008/0128067 A1 | 6/2008 | Sayir et al. |
| 2008/0152577 A1 | 6/2008 | Addiego et al. |
| 2008/0175764 A1 | 7/2008 | Sako |
| 2008/0240879 A1 | 10/2008 | Dourfaye et al. |
| 2008/0279710 A1 | 11/2008 | Zhamu et al. |
| 2008/0289813 A1 | 11/2008 | Gewily et al. |
| 2009/0059474 A1 | 3/2009 | Zhamu et al. |
| 2009/0075120 A1 | 3/2009 | Cornie et al. |
| 2009/0130515 A1 | 5/2009 | Son et al. |
| 2009/0151847 A1 | 6/2009 | Zhamu et al. |
| 2009/0194205 A1 | 8/2009 | Loffler et al. |
| 2009/0302552 A1 | 12/2009 | Leinfelder |
| 2010/0003530 A1 | 1/2010 | Ganguli et al. |
| 2010/0098956 A1 | 4/2010 | Sepeur et al. |
| 2010/0122821 A1 | 5/2010 | Corre et al. |
| 2010/0143690 A1 | 6/2010 | Romero et al. |
| 2010/0159357 A1 | 6/2010 | Otawa et al. |
| 2010/0163782 A1 | 7/2010 | Chang et al. |
| 2010/0196716 A1* | 8/2010 | Ohta ....................... C09K 5/14 428/408 |
| 2010/0203340 A1 | 8/2010 | Ruoff et al. |
| 2010/0207055 A1 | 8/2010 | Ueno et al. |
| 2010/0266790 A1 | 10/2010 | Kusinski et al. |
| 2011/0027573 A1 | 2/2011 | Strock et al. |
| 2011/0033721 A1 | 2/2011 | Rohatgi |
| 2011/0045724 A1 | 2/2011 | Bahukudumbi |
| 2011/0157772 A1 | 6/2011 | Zhamu et al. |
| 2011/0200825 A1* | 8/2011 | Chakraborty ............ C09D 1/00 428/412 |
| 2012/0107590 A1 | 5/2012 | Xu et al. |
| 2013/0001475 A1 | 1/2013 | Christ et al. |
| 2013/0114165 A1 | 5/2013 | Mosendz et al. |
| 2013/0284737 A1 | 10/2013 | Ju et al. |
| 2013/0287326 A1 | 10/2013 | Porter et al. |
| 2013/0292138 A1 | 11/2013 | Givens et al. |
| 2014/0051612 A1 | 2/2014 | Mazyar et al. |
| 2014/0127526 A1 | 5/2014 | Etschmaier et al. |
| 2014/0224466 A1 | 8/2014 | Lin et al. |
| 2014/0272592 A1 | 9/2014 | Thompkins et al. |
| 2015/0027567 A1 | 1/2015 | Shreve et al. |
| 2015/0034316 A1 | 2/2015 | Hallundbäk et al. |
| 2015/0068774 A1 | 3/2015 | Hallundbäk et al. |
| 2015/0158773 A1 | 6/2015 | Zhao et al. |
| 2015/0267816 A1 | 9/2015 | Boskovski |
| 2016/0089648 A1 | 3/2016 | Xu et al. |
| 2016/0108703 A1 | 4/2016 | Xu et al. |
| 2016/0130519 A1 | 5/2016 | Lei et al. |
| 2016/0136923 A1 | 5/2016 | Zhao et al. |
| 2016/0138359 A1 | 5/2016 | Zhao et al. |
| 2016/0145965 A1 | 5/2016 | Zhao et al. |
| 2016/0145966 A1 | 5/2016 | Zhao et al. |
| 2016/0145967 A1 | 5/2016 | Zhao et al. |
| 2016/0146350 A1 | 5/2016 | Zhao et al. |
| 2016/0160602 A1 | 6/2016 | Ruffo |
| 2016/0176764 A1 | 6/2016 | Xu et al. |
| 2016/0186031 A1 | 6/2016 | Zhao et al. |
| 2016/0333657 A1 | 11/2016 | Zhao et al. |
| 2017/0321069 A1 | 11/2017 | Zhao et al. |
| 2017/0342802 A1 | 11/2017 | Zhao et al. |

FOREIGN PATENT DOCUMENTS

| | | |
|---|---|---|
| EP | 0747615 B1 | 10/2001 |
| EP | 2056004 A1 | 5/2009 |
| EP | 2586963 A1 | 5/2013 |
| JP | S5424910 A | 2/1979 |
| JP | S5491507 A | 7/1979 |
| JP | S58181713 A | 10/1983 |
| JP | S6131355 A | 2/1986 |
| JP | H0238365 A | 2/1990 |
| JP | H0616404 A | 1/1994 |
| JP | 2014141746 | 8/2014 |
| WO | 9403743 | 2/1994 |
| WO | 03102360 | 12/2003 |
| WO | 2004015150 A2 | 2/2004 |
| WO | 2005115944 | 12/2005 |
| WO | 2007138409 A1 | 12/2007 |
| WO | 2008021033 A2 | 2/2008 |
| WO | 2011039531 A1 | 4/2011 |

(56) References Cited

FOREIGN PATENT DOCUMENTS

| WO | 2014028149 A1 | 2/2014 |
|---|---|---|
| WO | 2015021627 A1 | 2/2015 |

OTHER PUBLICATIONS

Hutsch et al., "Innovative Metal-Graphite Composites as Thermally Conducting Materials", PM2010 World Congress—PM Functional Materials—Heat Sinks, 2010, 8 pages.

International Search Report and Written Opinion; International Application No. PCT/US2014/065389; International Filing Date: Nov. 13, 2014; dated Mar. 18, 2015; 15 pages.

Levin et al., "Solid Particle Erosion Resistance and High Strain Rate Deformation Behavior of Inconel-625 Alloy", Superalloys 718, 625, 706 and Various Derivatives, The Minerals, Metals & Materials Society, 1997, 10 pages.

Miyamoto et al., "Development of New Composites; Ceramic Bonded Carbon", Transactions of JWRI, vol. 38, No. 2, 2009, pp. 57-61.

Moghadam et al, "Functional Metal Matrix Composites: Self-lubricating, Self-healing, and Nanocomposites—An Outlook", The Minerals, Metals & Materials Society, Apr. 5, 2014, 10 pages.

Pohlmann et al., "Magnesium alloy-graphite composites with tailored heat conduction properties for hydrogen storage applications", International Journal of Hydrogen Energy, 35 (2010), pp. 12829-12836.

Tikhomirov et al., "The chemical vapor infiltration of exfoliated graphite to produce carbon/carbon composites", Carbon, 49 (2011), pp. 147-153.

Yang et al., "Effect of tungsten addition on thermal conductivity of graphite/copper composites", Composites Part B: Engineering, May 31, 2013, vol. 55, pp. 1-4.

PCT International Search Report and Written Opinion; International Application No. PCT/US2015/054920; International Filing Date: Oct. 9, 2015; dated May 18, 2016; 12 pages.

Rashad et al. "Effect of of Graphene Nanoplatelets addition on mechanical properties of pure aluminum using a semi-powder method", Materials International, Apr. 20, 2014, vol. 24, pp. 101-108.

* cited by examiner

METHODS OF FORMING POLYMER COATINGS ON METALLIC SUBSTRATES

BACKGROUND

Polymer coatings have been broadly used in downhole tools and accessories to improve well production by reducing fluid flow resistance. Polymer coatings have also been used to protect metallic substrates by minimizing corrosion from sweet and sour gases in fluid streams. However, polymers normally do not form strong chemical bonds with metals. Accordingly, polymer coatings and the metallic substrates are often held together only by weak van der Waals forces, weak hydrogen bonding, or mechanical interlocking. Under challenging conditions, delamination can occur reducing the lifetime of the polymer coatings. Therefore materials and methods improving the reliability and long-term performance of polymer coatings on metallic substrates would be well-received in the art.

BRIEF DESCRIPTION

The above and other deficiencies in the prior art are overcome by, in an embodiment, an article comprising a substrate; a polymer coating; and an intermediate layer disposed between the substrate and the polymer coating, the intermediate layer comprising a carbon composite, wherein the carbon composite comprises carbon and a binder containing one or more of the following: $SiO_2$; Si; B; $B_2O_3$; a metal; or an alloy of the metal; and wherein the metal comprises one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

A method of coating a substrate comprises: disposing a carbon composite layer on a substrate; binding the carbon composite layer to the substrate forming a first binding layer between the carbon composite layer and the substrate; grafting a monomer, a first polymer, or a combination thereof on the carbon composite layer to provide a second binding layer; and coating the second binding layer with a coating composition comprising a second polymer; wherein the carbon composite layer comprises carbon and a binder; the binder comprises one or more of the following: $SiO_2$; Si; B; $B_2O_3$; a metal; or an alloy of the metal; and the metal comprises one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

BRIEF DESCRIPTION OF THE DRAWINGS

The following descriptions should not be considered limiting in any way. With reference to the accompanying drawings, like elements are numbered alike:

FIG. 1(a) shows a substrate coated with a carbon composite layer; FIG. 1(b) shows that a first binding layer is formed between the substrate and the carbon composite layer; FIG. 1(c) shows that a second biding layer has been grafted on the carbon composite layer; and FIG. 1(d) shows that a polymer coating is disposed on the second binding layer;

DETAILED DESCRIPTION

Figure 1:
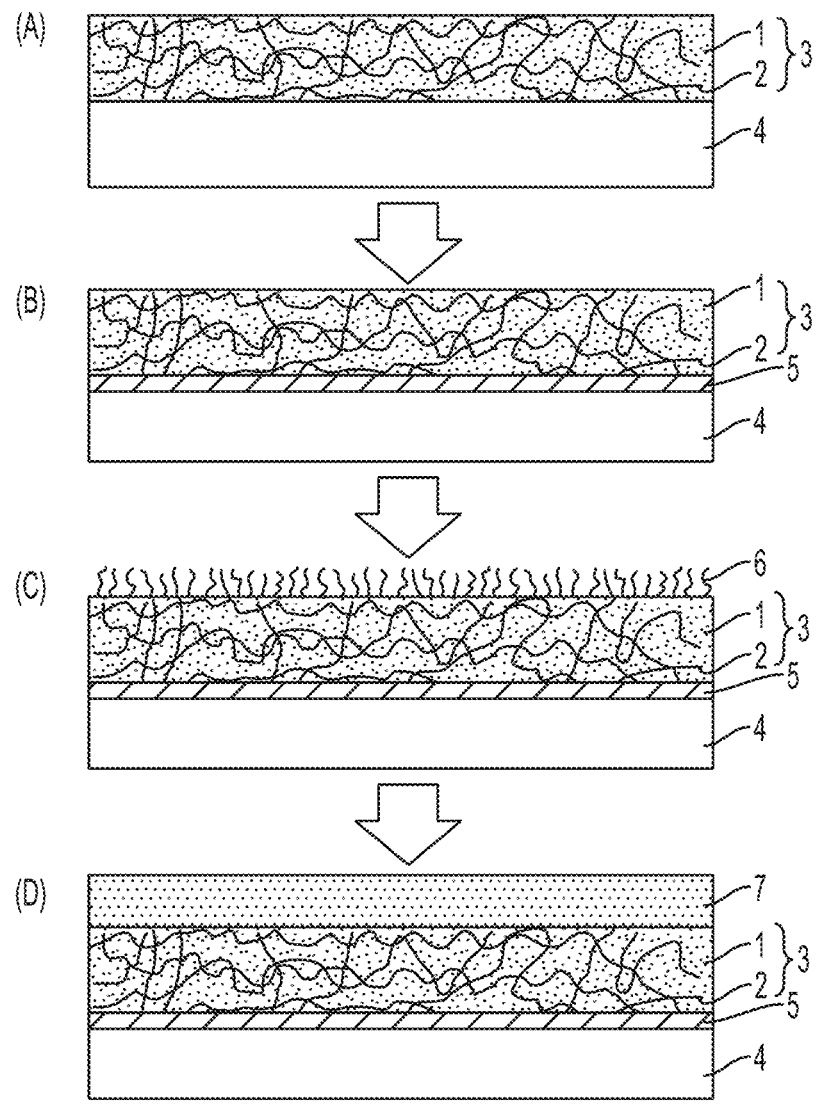
FIG. 1 illustrates a process for forming a polymer coating on a metallic substrate according to an embodiment of the disclosure, where

The inventors hereof have developed processes to coat polymers on metallic or ceramic substrates. Advantageously, an intermediate layer is disposed between a polymer coating and a metallic or ceramic substrate. The intermediate layer comprises a carbon composite, which contains carbon such as graphite and an inorganic binder. The inorganic binder in the carbon composite facilitates the binding of the intermediate layer to the substrate. Meanwhile the carbon in the carbon composite facilitates the binding of the intermediate layer to the polymer coating through strong chemical bonds such as covalent bonds. The processes allow for the manufacture of coated substrates having improved reliability and long-term performance.

In an embodiment, there is provided an article comprising a substrate; a polymer coating; and an intermediate layer disposed between the substrate and the polymer coating, wherein the intermediate layer comprises a carbon composite, which contains carbon and a binder.

The substrate can be a metal or a ceramic material. It can be used without surface processing or can be processed, including chemically, physically, or mechanically treating the substrate. For example, the substrate can be treated to roughen or increase a surface area of the substrate, e.g., by sanding, lapping, or sand blasting. A surface of the substrate can also be cleaned to remove contaminants through chemical and/or mechanical means.

The metal of the substrate includes elements from Group 1 to Group 12 of the periodic table, alloys thereof, or a combination thereof. Exemplary metals are magnesium, aluminum, titanium, manganese, iron, cobalt, nickel, copper, molybdenum, tungsten, palladium, chromium, ruthenium, gold, silver, zinc, zirconium, vanadium, silicon, or a combination thereof, including alloys thereof. Metal alloys include, for example, an aluminum-based alloy, magnesium-based alloy, tungsten-based alloy, cobalt-based alloy, iron-based alloy, nickel-based alloy, cobalt and nickel-based alloy, iron and nickel-based alloy, iron and cobalt-based alloy, copper-based alloy, and titanium-based alloy. As used herein, the term "metal-based alloy" means a metal alloy wherein the weight percentage of the specified metal in the alloy is greater than the weight percentage of any other component of the alloy, based on the total weight of the alloy. Exemplary metal alloys include steel, nichrome, brass, pewter, bronze, invar, inconel, hastelloy, MgZrZn, MgAlZn, AlCuZnMn, and AlMgZnSiMn.

The ceramic is not particularly limited and can be selected depending on the particular application of the substrate that has been coated with the carbon composite coating. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$) or titania ($TiO_2$). The oxide-based ceramic, nitride-based ceramic, carbide-based ceramic, boride-based ceramic, or silicide-based ceramic can contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like).

The substrate can be any shape. Exemplary shapes include a cube, sphere, cylinder, toroid, polygonal shape, helix, truncated shape thereof, or a combination thereof. The longest linear dimension of the substrate can be from 500 nm to hundreds of meters, without limitation. The substrate can have a thermal decomposition temperature that can withstand, without decomposition or degradation, exposure to a temperature from −10° C. to 800° C. However, coating disposed on the substrate can provide temperature shielding or thermal conductance to carry heat away from the substrate so that the substrate does not experience a temperature near its thermal decomposition temperature.

The intermediate layer comprises a carbon composite, which contains carbon and an inorganic binder. The carbon can be graphite. As used herein, graphite includes one or more of natural graphite; synthetic graphite; expandable graphite; or expanded graphite. Natural graphite is graphite formed by Nature. It can be classified as "flake" graphite, "vein" graphite, and "amorphous" graphite. Synthetic graphite is a manufactured product made from carbon materials. Pyrolytic graphite is one form of the synthetic graphite. Expandable graphite refers to graphite having intercallant materials inserted between layers of natural graphite or synthetic graphite. A wide variety of chemicals have been used to intercalate graphite materials. These include acids, oxidants, halides, or the like. Exemplary intercallant materials include sulfuric acid, nitric acid, chromic acid, boric acid, $SO_3$, or halides such as $FeCl_3$, $ZnCl_2$, and $SbCl_5$. Upon heating, the intercallant is converted from a liquid or solid state to a gas phase. Gas formation generates pressure which pushes adjacent carbon layers apart resulting in expanded graphite. The expanded graphite particles are vermiform in appearance, and are therefore commonly referred to as worms.

Graphite in general can be derivatized to include a variety of different functional groups such as, for example, carboxy (e.g., carboxylic acid groups), epoxy, ether, ketone, amine, hydroxy, alkoxy, alkyl, aryl, aralkyl, alkaryl, lactone, and the like.

In an exemplary embodiment, the graphite is derivatized by, for example, amination to include amine groups, where amination may be accomplished by nitration followed by reduction, or by nucleophilic substitution of a leaving group by an amine, substituted amine, or protected amine, followed by deprotection as necessary. In another embodiment, the graphite is derivatized by oxidative methods to produce an epoxy, hydroxy group or glycol group using a peroxide, or by cleavage of a double bond by for example a metal mediated oxidation such as a permanganate oxidation to form ketone, aldehyde, or carboxylic acid functional groups.

Where the functional groups are alkyl, aryl, aralkyl, alkaryl, or a combination of these groups, the functional groups are attached through intermediate functional groups (e.g., carboxy, amino) or directly to the graphite by: a carbon-carbon bond without intervening heteroatoms, to provide greater thermal and/or chemical stability to the derivatized graphite, as well as a more efficient synthetic process requiring fewer steps; by a carbon-oxygen bond (where the graphite contains an oxygen-containing functional group such as hydroxy or carboxylic acid); or by a carbon-nitrogen bond (where the nanoparticle contains a nitrogen-containing functional group such as amine or amide). In an embodiment, the graphite can be derivatized by metal mediated reaction with a C6-30 aryl or C7-30 aralkyl halide (F, Cl, Br, I) in a carbon-carbon bond forming step, such as by a palladium-mediated reaction such as the Stille reaction, Suzuki coupling, or diazo coupling, or by an organocopper coupling reaction.

In another embodiment, graphite is directly metallated by reaction with e.g., an alkali metal such as lithium, sodium, or potassium, followed by reaction with a C1-30 alkyl or C7-30 alkaryl compound with a leaving group such as a halide (Cl, Br, I) or other leaving group (e.g., tosylate, mesylate, etc.) in a carbon-carbon bond forming step. The aryl or aralkyl halide, or the alkyl or alkaryl compound, may be substituted with a functional group such as hydroxy, carboxy, ether, or the like. Exemplary groups include, for example, hydroxy groups, carboxylic acid groups, alkyl groups such as methyl, ethyl, propyl, butyl, pentyl, hexyl, octyl, dodecyl, octadecyl, and the like; aryl groups including phenyl and hydroxyphenyl; alkaryl groups such as benzyl groups attached via the aryl portion, such as in a 4-methylphenyl, 4-hydroxymethylphenyl, or 4-(2-hydroxyethyl)phenyl (also referred to as a phenethylalcohol) group, or the like, or aralkyl groups attached at the benzylic (alkyl) position such as found in a phenylmethyl or 4-hydroxyphenyl methyl group, at the 2-position in a phenethyl or 4-hydroxyphenethyl group, or the like. In an exemplary embodiment, the derivatized graphite is graphite substituted with a benzyl, 4-hydroxybenzyl, phenethyl, 4-hydroxyphenethyl, 4-hydroxymethylphenyl, or 4-(2-hydroxyethyl)phenyl group or a combination comprising at least one of the foregoing groups.

In an embodiment, the carbon composites comprise carbon microstructures having interstitial spaces among the carbon microstructures, wherein the binder is disposed in at least some of the interstitial spaces. In an embodiment, the carbon microstructures comprise unfilled voids within the carbon microstructures. In another embodiment, both the interstitial spaces among the carbon microstructures and the voids within the carbon microstructures are filled with the binder or a derivative thereof.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

There are two types of voids in the carbon composites—voids or interstitial spaces among carbon microstructures and voids within each individual carbon microstructures. The interstitial spaces among the carbon microstructures have a size of about 0.1 to about 100 microns, specifically about 1 to about 20 microns whereas the voids within the carbon microstructures are much smaller and are generally between about 20 nanometers to about 1 micron, specifically about 200 nanometers to about 1 micron. The shape of the voids or interstitial spaces is not particularly limited. As used herein, the size of the voids or interstitial spaces refers to the largest dimension of the voids or interstitial spaces and can be determined by high resolution electron or atomic force microscope technology.

The interstitial spaces among the carbon microstructures are filled with a micro- or nano-sized binder. For example, a binder can occupy about 10% to about 90% of the interstitial spaces among the carbon microstructures. In an embodiment, the binder does not penetrate the individual carbon microstructures and the voids within the carbon microstructures are unfilled, i.e., not filled with any binder.

Thus the carbon layers within the carbon microstructures are not locked together by a binder. Through this mechanism, the flexibility of the carbon composites, particularly, expanded carbon composites can be preserved. In another embodiment, to achieve high strength, the voids within the carbon microstructures are filled with the binder or a derivative thereof. Methods to fill the voids within the carbon microstructures include vapor deposition.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 $g/cm^3$, or about 0.1 to about 2 $g/cm^3$.

In the carbon composites, the carbon microstructures are held together by a binding phase. The binding phase comprises a binder which binds carbon microstructures by mechanical interlocking. Optionally, an interface layer is formed between the binder and the carbon microstructures. The interface layer can comprise chemical bonds, solid solutions, or a combination thereof. When present, the chemical bonds, solid solutions, or a combination thereof may strengthen the interlocking of the carbon microstructures. It is appreciated that the carbon microstructures may be held together by both mechanical interlocking and chemical bonding. For example the chemical bonding, solid solution, or a combination thereof may be formed between some carbon microstructures and the binder or for a particular carbon microstructure only between a portion of the carbon on the surface of the carbon microstructure and the binder. For the carbon microstructures or portions of the carbon microstructures that do not form a chemical bond, solid solution, or a combination thereof, the carbon microstructures can be bound by mechanical interlocking. The thickness of the binding phase is about 0.1 to about 100 microns or about 1 to about 20 microns. The binding phase can form a continuous or discontinuous network that binds carbon microstructures together.

Exemplary binders include a nonmetal, a metal, an alloy, or a combination comprising at least one of the foregoing. The nonmetal is one or more of the following: $SiO_2$; Si; B; or $B_2O_3$. The metal can be at least one of aluminum; copper; titanium; nickel; tungsten; chromium; iron; manganese; zirconium; hafnium; vanadium; niobium; molybdenum; tin; bismuth; antimony; lead; cadmium; or selenium. The alloy includes one or more of the following: aluminum alloys; copper alloys; titanium alloys; nickel alloys; tungsten alloys; chromium alloys; iron alloys; manganese alloys; zirconium alloys; hafnium alloys; vanadium alloys; niobium alloys; molybdenum alloys; tin alloys; bismuth alloys; antimony alloys; lead alloys; cadmium alloys; or selenium alloys. In an embodiment, the binder comprises one or more of the following: copper; nickel; chromium; iron; titanium; an alloy of copper; an alloy of nickel; an alloy of chromium; an alloy of iron; or an alloy of titanium. Exemplary alloys include steel, nickel-chromium based alloys such as Inconel*, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used.

The binder used to make the carbon composites can be micro- or nano-sized. In an embodiment, the binder has an average particle size of about 0.05 to about 250 microns, about 0.05 to about 50 microns, about 1 micron to about 40 microns, specifically, about 0.5 to about 5 microns, more specifically about 0.1 to about 3 microns. Without wishing to be bound by theory, it is believed that when the binder has a size within these ranges, it disperses uniformly among the carbon microstructures.

When an interface layer is present, the binding phase comprises a binder layer comprising a binder and an interface layer bonding one of the at least two carbon microstructures to the binder layer. In an embodiment, the binding phase comprises a binder layer, a first interface layer bonding one of the carbon microstructures to the binder layer, and a second interface layer bonding the other of the microstructures to the binder layer. The first interface layer and the second interface layer can have the same or different compositions.

The interface layer comprises one or more of the following: a C-metal bond; a C—B bond; a C—Si bond; a C—O—Si bond; a C—O-metal bond; or a metal carbon solution. The bonds are formed from the carbon on the surface of the carbon microstructures and the binder.

In an embodiment, the interface layer comprises carbides of the binder. The carbides include one or more of the following: carbides of aluminum; carbides of titanium; carbides of nickel; carbides of tungsten; carbides of chromium; carbides of iron; carbides of manganese; carbides of zirconium; carbides of hafnium; carbides of vanadium; carbides of niobium; or carbides of molybdenum. These carbides are formed by reacting the corresponding metal or metal alloy binder with the carbon atoms of the carbon microstructures. The binding phase can also comprise SiC formed by reacting $SiO_2$ or Si with the carbon of carbon microstructures, or $B_4C$ formed by reacting B or $B_2O_3$ with the carbon of the carbon microstructures. When a combination of binder materials is used, the interface layer can comprise a combination of these carbides. The carbides can be salt-like carbides such as aluminum carbide, covalent carbides such as SiC and $B_4C$, interstitial carbides such as carbides of the group 4, 5, and 6 transition metals, or intermediate transition metal carbides, for example the carbides of Cr, Mn, Fe, Co, and Ni.

In another embodiment, the interface layer comprises a solid solution of carbon such as graphite and a binder. Carbon has solubility in certain metal matrix or at certain temperature ranges, which can facilitate both wetting and binding of a metal phase onto the carbon microstructures. Through heat-treatment, high solubility of carbon in metal can be maintained at low temperatures. These metals include one or more of Co; Fe; La; Mn; Ni; or Cu. The binder layer can also comprise a combination of solid solutions and carbides.

The carbon composites comprise about 20 to about 95 wt. %, about 20 to about 80 wt. %, or about 50 to about 80 wt. % of carbon, based on the total weight of the carbon composites. The binder is present in an amount of about 5 wt. % to about 75 wt. % or about 20 wt. % to about 50 wt.

%, based on the total weight of the carbon composites. In the carbon composites, the weight ratio of carbon relative to the binder is about 1:4 to about 20:1, or about 1:4 to about 4:1, or about 1:1 to about 4:1.

The carbon composites can optionally comprise a filler. Exemplary filler includes one or more of the following: carbon fibers; carbon black; mica; clay; glass fibers; ceramic fibers; or ceramic powder. Ceramic materials include SiC, $Si_3N_4$, $SiO_2$, BN, and the like. The filler can be present in an amount of about 0.5 to about 50 w. %, about 0.5 to about 40 wt. %, about 0.5 to about 25 wt. %, 0.5 to about 10 wt. %, or about 1 to about 8%.

In an embodiment, the intermediate layer comprises one or more carbon composite foils. The carbon composite foils can be the same or different in terms of the thickness and the chemical makeup. To facilitate the binding between the intermediate layer and the substrate, when more than one carbon composite foils are present, the foil that is the closest to the substrate can have a greater amount of binder as compare to the foil that is further away from the substrate.

The intermediate layer formed on the substrate can completely cover the substrate or a surface of the substrate. The thickness of the intermediate layer can be from about 5 μm to about 10 mm, specifically about 10 μm to about 5 mm. In an embodiment, the intermediate layer is continuous and does not have voids, microvoids, fractures, or other defects, including pinholes and the like.

The intermediate layer can be bound to the substrate through a first binding layer. The thickness of the first binding layer can be about 50 nm to about 2 mm or about 100 nm to about 1 mm. The first binding layer comprises one or more of the following: a solid solution of the substrate and the binder in the carbon composite; a material that is included in both the binder of the carbon composite and the substrate; or a solder. In the embodiments where an activation foil is used, the binding layer can further comprise reaction products of an activation material. If present, the reaction products are dispersed in the solid solution, the material which is included in both the binder of the carbon composite and the substrate; or the solder in the binding layer.

A variety of alloys can be used as solders for joining the coating to the substrate depending on the intended use or application method. As used herein, solders include the filler metals for brazing. Exemplary solders include Cu alloys, Ag alloys, Zn alloys, Sn alloys, Ni alloys, and Pb alloys. Other known solder materials can also be used. The solders can further include combinations of the alloys.

The carbon such as graphite in the carbon composite can be derivatized by grafting certain polymer chains or monomers to the functional groups on the graphite. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included by reaction with functional groups on the graphite. Alternatively or in addition, graphite in the carbon composite can also be derivatized with monomers having polymerizable groups. The polymerizable groups include an α,β-unsaturated carbonyl group, α,β-unsaturated nitrile group, alkenyl group, alkynyl group, vinyl carboxylate ester group, carboxyl group, carbonyl group, epoxy group, isocyanate group, hydroxyl group, amide group, amino group, ester group, formyl group, nitrile group, nitro group, or a combination comprising at least one of the foregoing. The grafted polymers or monomers form a thin binding layer tethered to the surface of the intermediate layer through strong covalent bonds.

The polymer coating comprises polymers and resins such as phenolic resins including those prepared from phenol, resorcinol, o-, m- and p-xylenol, o-, m-, or p-cresol, and the like, and aldehydes such as formaldehyde, acetaldehyde, propionaldehyde, butyraldehyde, hexanal, octanal, dodecanal, benzaldehyde, salicylaldehyde, where exemplary phenolic resins include phenol-formaldehyde resins; epoxy resins such as those prepared from bisphenol A diepoxide, polyether ether ketones (PEEK), bismaleimides (BMI), nylons such as nylon-6 and nylon 6,6, polycarbonates such as bisphenol A polycarbonate, polyurethanes, nitrile-butyl rubber (NBR), hydrogenated nitrile-butyl rubber (HNBR), high fluorine content fluoroelastomers rubbers such as those in the FKM family and marketed under the tradename VITON® (available from FKM-Industries) and perfluoroelastomers such as FFKM (also available from FKM-Industries) and also marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyethylene, polyvinylalcohol (PVA), polyphenylene sulfide, polyphenylsulfone, self-reinforced polyphenylene, polyaryletherketone, or crosslinked products of these polymers.

In an embodiment, the polymer coating is adhered to the grafted thin binding layer through chain entanglement. In another embodiment, the polymer in the polymer coating can be crosslinked with the monomer or the polymer in the grafted thin binding layer.

Optionally a crosslinker is used to assist the crosslinking. The crosslinker can include a peroxy compound, metal peroxide, metal oxide, quinone, silica, sulfur or a combination thereof. Exemplary quinones include p-benzoquinone, tetramethylbenzoquinone, naphthoquinone, and the like. Peroxy compounds useful as crosslinkers include alkyl or aryl diperoxy compounds, and metal peroxides. Exemplary aryl diperoxy compounds include those based on dicumyl peroxide (DCP) and marketed by Arkema, Inc. under the tradename DI-CUP® including, DI-CUP® dialkyl peroxide, DI-CUP® 40C dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy) hexane and marketed by Akzo-Nobel under the tradename TRIGONOX® 101. Exemplary metal peroxides include magnesium peroxide, calcium peroxide, zinc peroxide, or the like, or a combination thereof. Metal oxides useful as crosslinkers include, for example, zinc oxide, magnesium oxide, titanium dioxide, or the like, or a combination thereof.

A method for coating a substrate comprises disposing a carbon composite layer on a substrate; binding the carbon composite layer to the substrate forming a first binding layer between the carbon composite layer and the substrate; grafting a monomer, a first polymer, or a combination thereof on the carbon composite layer to provide a second binding layer; and coating the second binding layer with a composition comprising a second polymer.

In an embodiment, binding the carbon composite layer to the substrate comprises heating the carbon composite layer and the substrate to form a first binding layer between the carbon composite layer and the substrate. The method of heating is not particularly limited. For example, the carbon composite coated substrate can be heated in an oven at a temperature of about 350° C. to about 1400° C., specifically about 800° C. to about 1200° C. Optionally, the method further comprises pressing the carbon composite layer and the substrate together during heating.

In another embodiment, binding the carbon composite layer to the substrate comprises heating the carbon composite layer and a surface of the substrate that the coating is disposed on by one or more of the following means: direct current heating; induction heating; microwave heating; or spark plasma sintering. Optionally a force can be applied to the carbon composite layer and the substrate to hold them together during heating.

For example, an electric current can pass through an electrode to the substrate and the carbon composite layer. Heat is generated due to the higher electrical resistance where the carbon composite layer and the substrate contact each other. The generated heat can melt or soften the binder in the carbon composite layer and/or the material on the surface of the substrate forming a first binding layer between the carbon composite layer and the substrate. Upon cooling, the binding layer binds the carbon composite layer to the substrate.

In an embodiment, the method further comprises disposing a solder between the carbon composite layer and the substrate; applying heat to the solder; and binding the carbon composite layer to the substrate. Because the solder can have a lower melting point or a lower softening temperature as compared to the inorganic binder in the carbon composite and the substrate material, less heat may be required if a solder is used. Optionally the method further comprises pressing the carbon composite layer and the substrate together while applying heat to the solder.

In another embodiment, the method further comprises disposing an activation foil between a substrate and the carbon composite layer; and exposing the activation foil to a selected form of energy to bind the carbon composite layer to the substrate. Alternatively, the activation foil can be laminated onto a carbon composite foil to form a carbon composite layer. Then the carbon composite layer, which comprises the carbon composite foil and the activation foil, can be disposed on a surface of the substrate. Optionally the method further includes pressing the carbon composite layer, the activation foil, and the substrate together while exposing the activation foil to a selected form of energy.

An activation foil comprises materials or reactants that can undergo intense exothermic reactions to generate large amounts of localized heat when exposed to a selected form of energy. The selected form of energy includes electric current; electromagnetic radiation, including infrared radiation, ultraviolet radiation, gamma ray radiation, and microwave radiation; or heat. Accordingly, activation foils can serve as a heat source for joining the carbon composite layer to the substrate.

Thermite and self-propagating powder mixtures are usable as the activation material. Thermite compositions include, for example, a metal powder (a reducing agent) and a metal oxide (an oxidizing agent) that produces an exothermic oxidation-reduction reaction known as a thermite reaction. Choices for a reducing agent include aluminum, magnesium, calcium, titanium, zinc, silicon, boron, and combinations including at least one of the foregoing, for example, while choices for an oxidizing agent include boron oxide, silicon oxide, chromium oxide, manganese oxide, iron oxide, copper oxide, lead oxide and combinations including at least one of the foregoing, for example. Self-propagating powder mixtures include one or more of the following: Al—Ni (a mixture of Al powder and Ni powder); Ti—Si (a mixture of Ti powder and Si powder); Ti—B (a mixture of Ti powder and B powder); Zr—Si (a mixture of Zr powder and Si powder), Zr—B (a mixture of Zr powder and B powder); Ti—Al (a mixture of Ti powder and Al powder); Ni—Mg (a mixture of Ni powder and Mg powder); or Mg—Bi (a mixture of Mg powder and Bi powder).

The methods to prepare carbon composites have been disclosed in co-pending application Ser. No. 14/499,397, which is incorporated herein by reference in its entirety. One way to form the carbon composites in the coating is to compress a combination comprising carbon and a micro- or nano-sized binder to provide a green compact by cold pressing; and to compressing and heating the green compact thereby forming the carbon composites. In another embodiment, the combination can be pressed at room temperature to form a compact, and then the compact is heated at atmospheric pressure to form the carbon composite. These processes can be referred to as two-step processes. Alternatively, a combination comprising carbon and a micro- or nano-sized binder can be compressed and heated directly to form the carbon composites. The process can be referred to as a one-step process.

In the combination, the carbon such as graphite is present in an amount of about 20 wt. % to about 95 wt. %, about 20 wt. % to about 80 wt. %, or about 50 wt. % to about 80 wt. %, based on the total weight of the combination. The binder is present in an amount of about 5 wt. % to about 75 wt. % or about 20 wt. % to about 50 wt. %, based on the total weight of the combination. The graphite in the combination can be in the form of a chip, powder, platelet, flake, or the like. In an embodiment, the graphite is in the form of flakes having a diameter of about 50 microns to about 5,000 microns, preferably about 100 to about 300 microns. The graphite flakes can have a thickness of about 1 to about 5 microns. The density of the combination is about 0.01 to about 0.05 g/cm$^3$, about 0.01 to about 0.04 g/cm$^3$, about 0.01 to about 0.03 g/cm$^3$ or about 0.026 g/cm$^3$. The combination can be formed by blending the graphite and the micro- or nano-sized binder via any suitable methods known in the art. Examples of suitable methods include ball mixing, acoustic mixing, ribbon blending, vertical screw mixing, and V-blending. In another embodiment, the combination is made by vapor deposition. A "vapor deposition" process refers to a process of depositing materials on a substrate through the vapor phase. Vapor deposition processes include physical vapor deposition, chemical vapor deposition, atomic layer deposition, laser vapor deposition, and plasma-assisted vapor deposition. Examples of the binder precursors include triethylaluminum and nickel carbonyl. Different variations of physical deposition, chemical deposition, and plasma-assisted vapor deposition can be used. Exemplary deposition processes can include plasma assisted chemical vapor deposition, sputtering, ion beam deposition, laser ablation, or thermal evaporation. Through a vapor deposition process, the binder can at least partially fill the voids within the carbon microstructures.

Referring to the two-step process, cold pressing means that the combination comprising the graphite and the micro-sized or nano-sized binder is compressed at room temperature or at an elevated temperature as long as the binder does not significantly bond with the graphite microstructures. In an embodiment, greater than about 80 wt. %, greater than about 85 wt. %, greater than about 90 wt. %, greater than about 95 wt. %, or greater than about 99 wt. % of the microstructures are not bonded in the green compact. The pressure to form the green compact can be about 500 psi to about 10 ksi and the temperature can be about 20° C. to about 200° C. The reduction ratio at this stage, i.e., the volume of the green compact relative to the volume of the combination, is about 40% to about 80%. The density of the green compact is about 0.1 to about 5 g/cm$^3$, about 0.5 to about 3 g/cm$^3$, or about 0.5 to about 2 g/cm$^3$.

The green compact can be heated at a temperature of about 350° C. to about 1400° C., specifically about 800° C. to about 1200° C. to form the carbon composites. In an embodiment, the temperature is about ±20° C. to about ±100° C. of the melting point of the binder, or about ±20° C. to about ±50° C. of the melting point of the binder. In another embodiment, the temperature is above the melting point of the binder, for example, about 20° C. to about 100° C. higher or about 20° C. to about 50° C. higher than the melting point of the binder. When the temperature is higher, the binder becomes less viscose and flows better, and less pressure may be required in order for the binder to be evenly distributed in the voids among the carbon microstructures. However, if the temperature is too high, it may have detrimental effects to the instrument.

The temperature can be applied according to a predetermined temperature schedule or ramp rate. The means of heating is not particularly limited. Exemplary heating methods include direct current (DC) heating, induction heating, microwave heating, and spark plasma sintering (SPS). In an embodiment, the heating is conducted via DC heating. For example, the combination comprising the graphite and the micro- or nano-sized binder can be charged with a current, which flows through the combination generating heat very quickly. Optionally, the heating can also be conducted under an inert atmosphere, for example, under argon or nitrogen. In an embodiment, the green compact is heated in the presence of air.

The heating can be conducted at a pressure of about 500 psi to about 30,000 psi or about 1000 psi to about 5000 psi. The pressure can be a superatmospheric pressure or a subatmospheric pressure. Without wishing to be bound by theory, it is believed that when a superatmospheric pressure is applied to the combination, the micro- or nano-sized binder is forced into the voids among carbon microstructures through infiltration. When a subatmospheric pressure is applied to the combination, the micro- or nano-sized binder can also be forced into the voids among the carbon microstructures by capillary forces.

In an embodiment, the desirable pressure to form the carbon composites is not applied all at once. After the green compact is loaded, a low pressure is initially applied to the composition at room temperature or at a low temperature to close the large pores in the composition. Otherwise, the melted binder may flow to the surface of the die. Once the temperature reaches the predetermined maximum temperature, the desirable pressure required to make the carbon composites can be applied. The temperature and the pressure can be held at the predetermined maximum temperature and the predetermined maximum pressure for about 5 minutes to about 120 minutes. In an embodiment, the predetermined maximum temperature is about ±20° C. to about ±100° C. of the melting point of the binder, or about ±20° C. to about ±50° C. of the melting point of the binder.

The reduction ratio at this stage, i.e. the volume of the carbon composite relative to the volume of the green compact, is about 10% to about 70% or about 20 to about 40%. The density of the carbon composite can be varied by controlling the degree of compression. The carbon composites have a density of about 0.5 to about 10 g/cm$^3$, about 1 to about 8 g/cm$^3$, about 1 to about 6 g/cm$^3$, about 2 to about 5 g/cm$^3$, about 3 to about 5 g/cm$^3$, or about 2 to about 4 g/cm$^3$.

Alternatively, also referring to a two-step process, the combination can be first pressed at room temperature and a pressure of about 500 psi to 30,000 psi to form a compact; the compact can be further heated at a temperature of about 350° C. to about 1200° C., specifically about 800° C. to about 1200° C. to make the carbon composite. In an embodiment, the temperature is about ±20° C. to about ±100° C. of the melting point of the binder, or about ±20° C. to about ±50° C. of the melting point of the binder. In another embodiment, the temperature can be about 20° C. to about 100° C. higher or about 20° C. to about 50° C. higher than the melting point of the binder. The heating can be conducted at atmospheric pressure in the presence or absence of an inert atmosphere.

In another embodiment, the carbon composite can be made from the combination of the graphite and the binder directly without making the green compact. The pressing and the heating can be carried out simultaneously. Suitable pressures and temperatures can be the same as discussed herein for the second step of the two-step process.

Hot pressing is a process that applies temperature and pressure simultaneously. It can be used in both the one-step and the two-step processes to make carbon composites.

The carbon composite foils can be made in a mold through a one-step or a two-step process. The carbon composite foils can also be made via hot rolling. In an embodiment, the carbon composite foils made by hot rolling can be further heated to allow the binder to effectively bond the carbon microstructures together.

Figure 2:
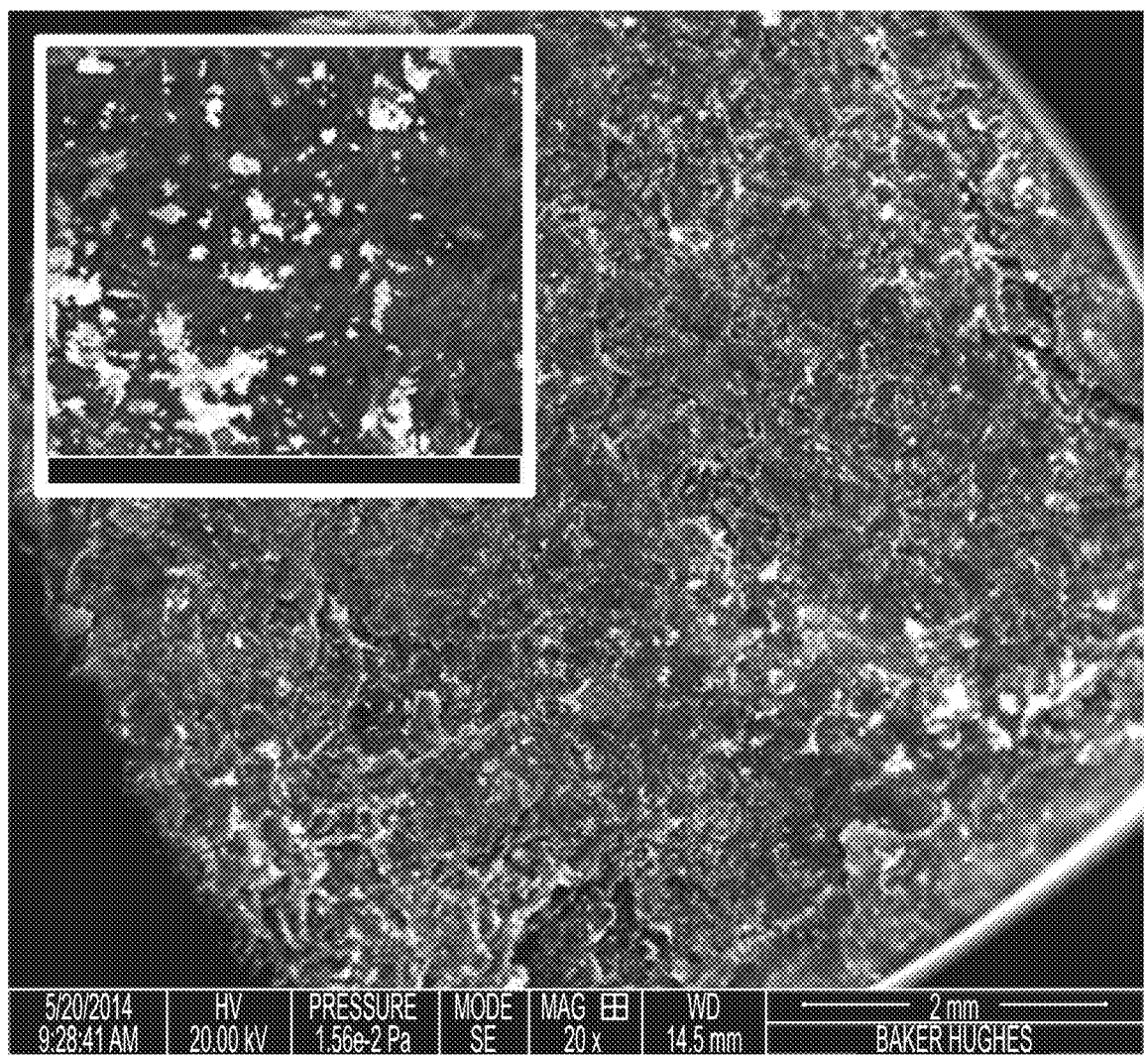
FIG. 2 is a SEM image of a carbon composite according to an embodiment of the disclosure.

The carbon composite foils can be used directly. As shown in FIG. 2, SEM characterization of a carbon composite according to an embodiment of the disclosure shows that over 80% of the carbon composite is covered by graphite phase. Accordingly, carbon composite provides sufficient surface area to bond the polymers/monomers. Alternatively, one or both sides of a carbon composite foil can be treated to roughen or increase a surface of the carbon composite foil before it is disposed on the substrate. Exemplary method includes sanding, lapping, or sand blasting. The roughed surface provides more bonding areas. In addition, the roughed surface can facilitate the adhesion of the polymer coating to the carbon composite layer by mechanical interlocking.

Grafting can form covalent bonds between the second binding layer and the carbon composite layer. For example, a polymer or monomer can be grafted to the carbon composite layer by reacting the functional groups on the polymer/monomer with the functional groups on the carbon of the carbon composite layer. As used herein, "grafting" includes "grafting to" and "grafting from" methods. Grafting to method includes grafting an end-functional polymer via the functional groups on the carbon composite layer. The reaction can be performed in solution of the polymer or from the polymer melt. For example, a solution or dispersion of the end-functional polymer can be coated on the carbon composite layer disposed on the substrate. Subsequently the end-functional polymer coated laminate structure can be heated to graft the end-functionalized polymer to the carbon composite layer.

Grafting from method refers to the method of synthesis of a covalently attached polymer in situ on the carbon composite layer disposed on the substrate. Known mechanisms for polymer synthesis can be employed for "grafting from" approach. Depending on the reaction mechanism, an initiator may be covalently attached to the carbon composite surface. For radical polymerization, azo-initiators, peroxide- or photo-initiators can be used.

The coating composition comprises a polymer as described herein in the context of polymer coating. Optionally the coating composition further comprises a crosslinker. The crosslinker can be present in an amount from 0.1 wt % to 15 wt %, specifically 0.5 wt % to 10 wt %, and more specifically 0.5 wt % to 5 wt %, based on the weight of the polymer in the coating composition.

The coating composition may be coated on the second binding layer by any suitable method such as, but not limited to, lamination, dip coating, spray coating, roll coating, spin casting, layer-by-layer coating, Langmuir-Blodgett coating, and the like. The coating is then dried at ambient temperatures, or in an oven operating at elevated temperatures of greater than room temperature, specifically greater than or equal to 80° C., more specifically greater than or equal to 90° C., and still more specifically greater than or equal to 100° C. The coating can be further cured to strengthen and provide a protective, solvent and abrasion resistant matrix, where curing may be a thermal cure; irradiation using ionizing or non-ionizing radiation including visible or ultraviolet light, e-beam, x-ray, or the like; chemical curing as by e.g., exposure to an active curing agent such as an acid or base; or the like.

An exemplary process for coating a substrate is illustrated in FIG. 1. As shown in FIG. 1, a carbon composite layer 3, which comprises graphite 1 and binder 2, is first disposed on substrate 4. Then the carbon composite layer is bound to the substrate forming a first binding layer 5. Next, a monomer, a first polymer, or a combination thereof is grafted on the surface of the carbon composite layer 3 forming a second binding layer 6. Finally a polymer coating 7 is formed on the second binding layer (not shown in FIG. 2(d)).

Articles containing such coatings are useful for a wide variety of applications including but are not limited to electronics, atomic energy, hot metal processing, coatings, aerospace, automotive, oil and gas, and marine applications. For example, exemplary articles include a downhole tool, tubular, pipeline, flow control device, filter, membrane, sand screen, motor cover, mesh, sheet, packer element, blow out preventer element, submersible pump motor protector bag, sensor protector, sucker rod, O-ring, T-ring, gasket, pump shaft seal, tube seal, valve seal, seal for an electrical component, insulator for an electrical component, or a seal for a drilling motor.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Or" means "and/or." "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. "A combination thereof" means "a combination comprising one or more of the listed items and optionally a like item not listed." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An article comprising
   a substrate comprising a metal or an alloy of the metal, the metal comprising one or more of the following: magnesium; aluminum; titanium; manganese; iron; cobalt; nickel; copper; molybdenum; tungsten; palladium; chromium; ruthenium; gold; silver; zinc; zirconium; vanadium; or silicon;
   a polymer coating; and
   an intermediate layer disposed between the substrate and the polymer coating, the intermediate layer comprising a carbon composite,
   the carbon composite comprising carbon and a binder containing one or more of the following: $SiO_2$; Si; B; $B_2O_3$; a metal of the carbon composite; or an alloy of the metal; and
   the metal of the carbon composite comprising one or more of the following: aluminum; copper; titanium; nickel; tungsten; chromium; iron; manganese; zirconium; hafnium; vanadium; niobium; molybdenum; tin; bismuth; antimony; lead; cadmium; or selenium,
   wherein the article further comprises a first binding layer directly disposed on the substrate and between the intermediate layer and the substrate, the first binding layer comprising one or more of the following: a solid solution of the metal in the substrate and the binder in the carbon composite; a solder; or a reaction product of a thermite composition comprising a reducing agent and an oxidization agent; and
   the article further comprises a second binding layer between the polymer coating and the intermediate layer, the second binding layer comprising a first polymer, a monomer or a combination thereof, the first polymer and the monomer being bonded to the carbon in the carbon composite of the intermediate layer through covalent bonding.

2. The article of claim 1, wherein the polymer coating comprises one or more of the following: a fluoroelastomer; a perfluoroelastomer, hydrogenated nitrile butyl rubber; ethylene-propylene-diene monomer (EPDM) rubber; a silicone; an epoxy; polyetheretherketone; bismaleimide; polyethylene; a polyvinylalcohol; a phenolic resin; a nylon; a polycarbonate; a polyurethane; a tetrafluoroethylene-propylene elastomeric copolymer; polyphenylene sulfide; polyphenylsulfone; self-reinforced polyphenylene; a polyaryletherketone; or a crosslinked product thereof.

3. The article of claim 1, wherein the carbon in the carbon composite comprises graphite.

4. The article of claim 3, wherein the graphite is derivatized to have one or more of the following functional groups: carboxy; epoxy; ether; ketone; amine; hydroxy; alkoxy; alkyl; lactone; or aryl.

5. The article of claim 1, wherein the second binding layer between the polymer coating and the intermediate layer comprises the first polymer; and the first polymer comprises one or more of the following: an acrylic chain; a polyamine; or a poly(alkylene glycol).

6. The article of claim 1, wherein the second binding layer between the polymer coating and the intermediate layer comprises the monomer; and the monomer comprises one or more of the following polymerizable groups: an $\alpha,\beta$-unsaturated nitrile group; alkenyl group; alkynyl group; vinyl carboxylate ester group; carboxyl group; carbonyl group; epoxy group; isocyanate group; hydroxyl group; amide group; amino group; ester group; formyl group; nitrile group; or nitro group.

7. The article of claim 1, wherein the polymer coating has a thickness of about 5 μm to about 10 mm.

8. The article of claim 1, wherein the carbon composite comprises carbon microstructures having interstitial spaces among the carbon microstructures, wherein the binder is disposed in at least some of the interstitial spaces.

9. The article of claim 8, wherein the carbon microstructures comprise unfilled voids within the carbon microstructures.

10. The article of claim 8, wherein the binder or a derivative thereof is disposed in the voids within the carbon microstructures.

11. The article of claim 1, wherein the first binding layer comprises the solder.

12. The article of claim 1, wherein the first binding layer comprises the reaction product of the thermite composition, the reducing agent comprising aluminum, magnesium, calcium, titanium, zinc, silicon, boron, and combinations including at least one of the foregoing, and the oxidizing agent comprising boron oxide, silicon oxide, chromium oxide, manganese oxide, iron oxide, copper oxide, lead oxide and combinations including at least one of the foregoing.

13. A method of coating a substrate to form the article of claim 1, the method comprising:
  disposing the intermediate layer on the substrate;
  binding the intermediate layer to the substrate forming the first binding layer directly on the substrate and between the intermediate layer and the substrate, the first binding layer comprising one or more of the following: the solid solution of the metal in the substrate and the binder in the carbon composite; the solder; or the reaction product of the thermite composition comprising the reducing agent and the oxidization agent;
  grafting the monomer, the first polymer, or the combination thereof on the intermediate layer disposed on the substrate to provide the second binding layer, the first polymer and the monomer being bonded to the carbon in the intermediate layer through covalent bonding; and
  coating the second binding layer with a coating composition comprising a second polymer forming the polymer coating;
  wherein the intermediate layer comprises carbon and the binder;
  the binder comprises one or more of the following: $SiO_2$; Si; B; $B_2O_3$; a metal of the carbon composite; or the alloy of the metal; and
  the metal of the carbon composite comprises one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

14. The method of claim 13, wherein coating the second binding layer comprises one or more of the following: lamination; dip coating; solvent casting; painting; spraying coating; roll coating; layer-by-layer coating; spin coating; or Langmuir-Blodgett coating.

15. The method of claim 13, wherein the coating composition further comprises a crosslinker.

16. The method of claim 13, wherein the method further comprises crosslinking the first polymer with the second polymer.

17. The method of claim 13, wherein binding the intermediate layer to the substrate comprises heating the intermediate layer and the substrate to form the first binding layer between the intermediate layer and the substrate; wherein optionally the intermediate layer and the substrate are pressed together during heating.

18. The method of claim 13, wherein binding the intermediate layer to the substrate comprises heating the intermediate layer and a surface of the substrate that the intermediate layer is disposed on by one or more of the following: direct current heating; induction heating; microwave heating; or spark plasma sintering; wherein optionally the intermediate layer and the substrate are pressed together during heating.

19. The method of claim 13, wherein the method further comprises disposing the solder between the intermediate layer and the substrate; applying heat to the solder; and binding the intermediate layer to the substrate thereby forming the first binding layer; wherein optionally the intermediate layer and the substrate are pressed together while applying heat to the solder.

20. The method of claim 13, wherein the reducing agent comprises one or more of the following: aluminum; magnesium; calcium; titanium; zinc; silicon; or boron; and the oxidizing agent comprises one or more of the following: boron oxide; silicon oxide; chromium oxide; manganese oxide; iron oxide; copper oxide; or lead oxide.

21. An article comprising
  a substrate comprising a metal or an alloy of the metal, the metal comprising one or more of the following: magnesium; aluminum; titanium; manganese; iron; cobalt; nickel; copper; molybdenum; tungsten; palladium; chromium; ruthenium; gold; silver; zinc; zirconium; vanadium; or silicon;
  a polymer coating; and
  an intermediate layer disposed between the substrate and the polymer coating, the intermediate layer comprising a carbon composite,
  the carbon composite comprising carbon and a binder containing one or more of the following: $SiO_2$; Si; B; $B_2O_3$; a metal of the carbon composite; or an alloy of the metal; and
  wherein the metal of the carbon composite comprises one or more of the following: aluminum; copper; titanium; tungsten; chromium; manganese; zirconium; hafnium; vanadium; niobium; molybdenum; tin; bismuth; antimony; lead; cadmium; or selenium,
  wherein the article further comprises a first binding layer directly disposed on the substrate and between the intermediate layer and the substrate; the first binding layer comprising one or more of the following: a solid solution of the metal of the substrate and the binder in the carbon composite; a solder; or a reaction product of a thermite composition comprising a reducing agent and an oxidization agent, and
  the article further comprises a second binding layer between the polymer coating and the intermediate layer, the second binding layer comprising a first polymer or a monomer, the first polymer and the monomer being bonded to the carbon in the carbon composite of the intermediate layer through covalent bonding.

* * * * *